2 Sheets—Sheet 2.

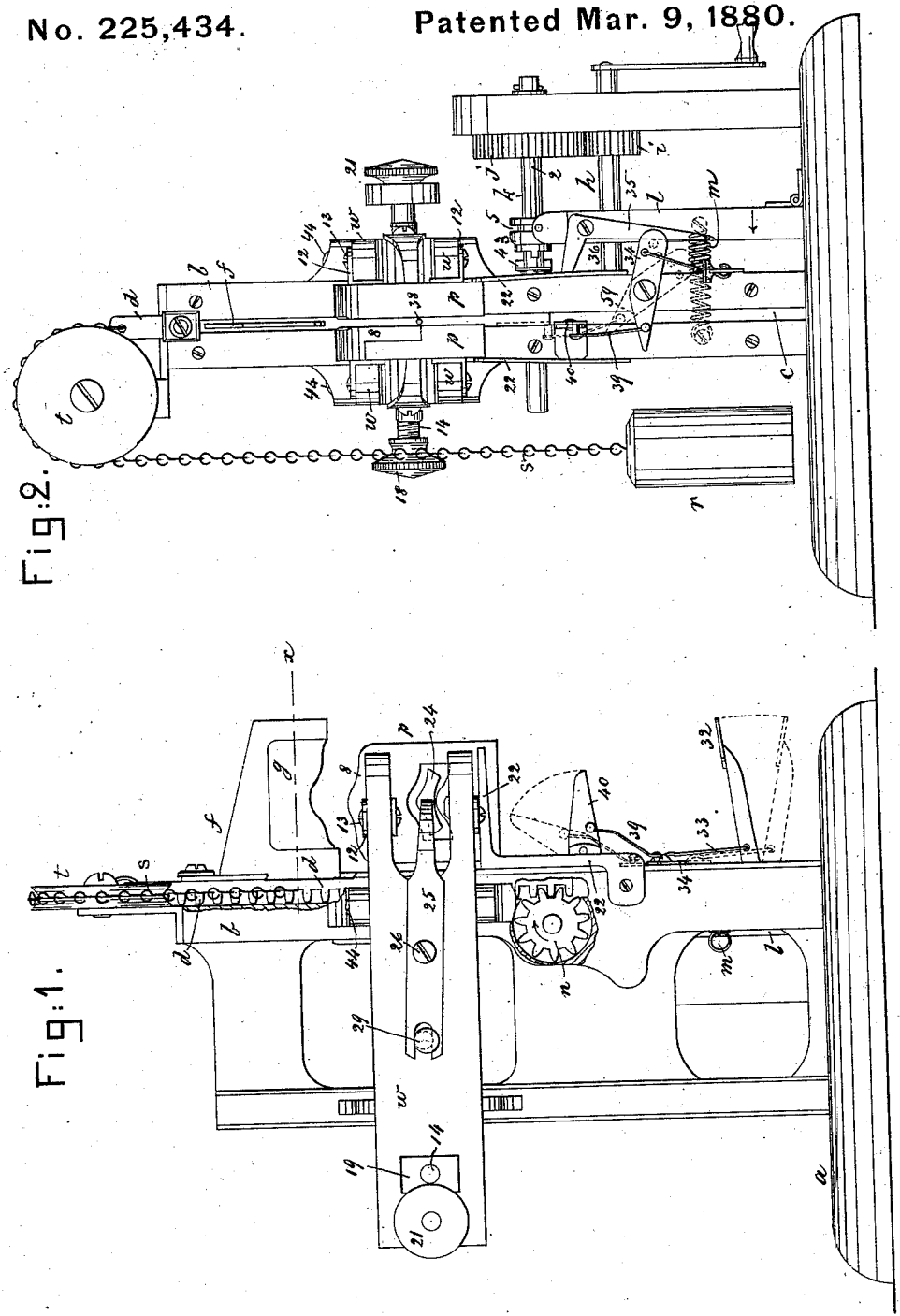

C. STODDARD & J. W. D. FIFIELD.
Crimping-Machine.

No. 225,434. Patented Mar. 9, 1880.

Witnesses.
Jos. P. Livermore,
N. E. C. Whitney.

Inventor.
Curtis Stoddard and John W. D. Fifield
by Crosby & Gregory, Attys

UNITED STATES PATENT OFFICE.

CURTIS STODDARD AND JOHN W. D. FIFIELD, OF NORTH BROOKFIELD, MASSACHUSETTS.

CRIMPING-MACHINE.

SPECIFICATION forming part of Letters Patent No. 225,434, dated March 9, 1880.

Application filed January 16, 1880.

*To all whom it may concern:*

Be it known that we, CURTIS STODDARD and JOHN W. D. FIFIELD, of North Brookfield, Worcester county, State of Massachusetts, have invented an Improvement in Crimping-Machines, of which the following description, in connection with the accompanying drawings, is a specification.

This invention relates to crimping-machines for crimping the uppers or vamps of shoes and boots.

One part of our invention consists in the employment, in a crimping-machine having crimping-jaws, of rubbing devices to act upon the upper at or near the edge of the form over which the upper is shaped and prevent the formation of wrinkles in the upper or vamp; also, in a reciprocatable form, combined with a pair of jaws pivoted upon levers, and with means to adjust the levers to control the position of the jaws with relation to thickness of the upper; also, in a crimping-machine, a jaw pivoted upon a vibratable lever, combined with a leveling device to always insure parallelism of the faces of the jaws with relation to the form under all adjustments of the levers upon which the jaws are pivoted; also, in an upper-discharging device, adapted to act upon and discharge the upper or vamp from the form after having been crimped; also, in a form connected with a reciprocatable rack-bar, a pinion, a clutch to move it intermittingly, and means, under the control of a treadle, for operating the clutch so that it will be moved and retained in engagement sufficiently long to lower and raise the form when the motion of the form is automatically stopped until the clutch is again engaged.

The form, made readily detachable from the form-carrier, extended from a reciprocatable rack-bar, forces the vamp down between the faces of the crimping-jaws, pivoted at the ends of levers made adjustable by a screw or otherwise to adapt the jaws to leather of different thickness.

In openings made in the jaws rest the rubbing devices, adapted by their reciprocation to act upon the upper or vamp near the edge of the form, and so smooth it as to fully avoid the formation of wrinkles in the crimped boot or shoe, the said rubbing devices in operation being analogous in function with the rub-stick commonly used by hand.

Figure 3:
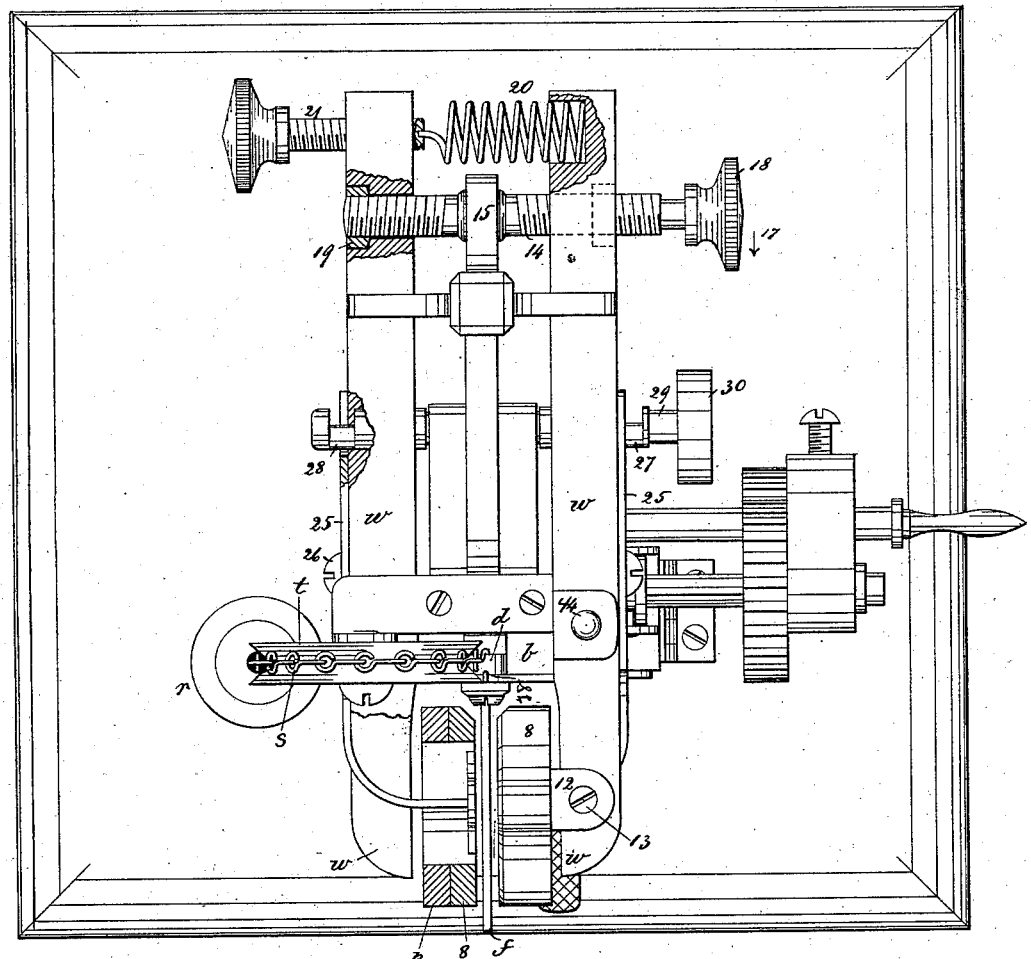
Figure 4:
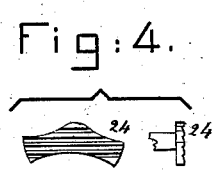
Figures 5, 6:
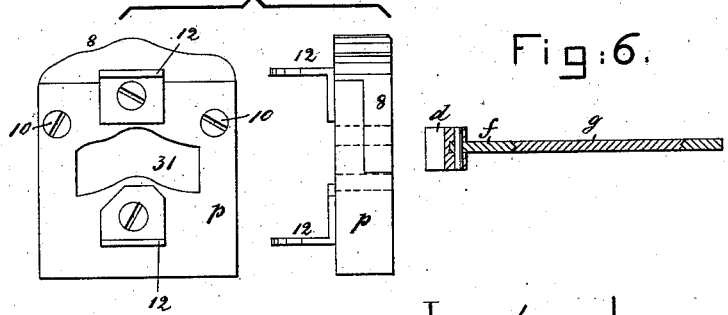

Figure 1 represents, in side elevation, one of our crimping-machines, commonly called a "brake;" Fig. 2, a front view thereof; Fig. 3, a top view, partially in section; Fig. 4, details of the rubbing device; Fig. 5, details of the jaws, and Fig. 6 a section of the form and form-carrier on the dotted line, Fig. 1.

The base $a$ of the machine has rising from it suitable uprights to serve as bearings to support the working parts, and also an upright standard, $b$, in which is a guideway, $c$, that receives the rack-bar $d$, secured to which is the form-carrier $f$, in which is slid or detachably fitted the form $g$, which gives to the vamp or upper its desired outline or shape, according to the shape of the acting edge of the form. In this instance of our invention the said form is dovetailed into the form-carrier. (See Fig. 6.)

The main driven shaft $h$ of the machine, turned by power in any usual manner, has upon it a pinion, $i$, that engages with gear $j$ on and drives shaft $k$, provided with a spline, 2, to so connect the half 3 of the clutch-sleeve therewith that the said half 3 will always be rotated with the said shaft, yet be free to slide thereon under the control of a suitable treadle or lever, which, at the proper times, as hereinafter described, causes the clutch-half 3 to be moved toward so as to engage and rotate the other half, 4, of the clutch, or to be moved away from it when the said clutch-half 4 is to remain at rest.

The clutch-half 3 is provided with an annular groove, 5, that receives a pin or pins of a fork at the upper end of a pivoted lever, $l$, provided with a spring, $m$, the tendency of which is to cause the clutch part 3 to engage the clutch part 4. The clutch part 4, made as a sleeve having its bearing in the upright part $b$, is placed in the shaft $k$ loosely, and the sleeve of the said part has fixed to it a pinion, $n$, which, as the clutch parts 3 4 are engaged, causes the said pinion then at rest, but in engagement with the teeth of the rack $d$, to rotate in the direction of the arrow, Fig. 1, and draw down the rack and crimping form, causing it to pass the vamp or upper between the faces of the crimping-jaws p, to be hereinafter described; but on reaching its lowest position the clutch is automatically disengaged, when the rack-elevating mechanism (herein shown as a weight, r, connected with a chain, s, passed over a sheave, t,) acts to lift the rack and form quickly.

Instead of a weight and chain or cord, we might employ a system of springs.

The jaws p have detachable faces 8, connected therewith by screws 10, which may be removed, and faces of other sizes and shapes be substituted therefor, to properly co-operate with the form g being used.

In all other crimping-machines known to us, when it is desired to crimp vamps of different sizes the entire jaw has to be removed and adjusted in position, which requires the expenditure of much time that by our plan is saved.

The jaws p have ears 12, to receive screws 13, by which they are pivoted upon the ends of the levers or arms w, pivoted at 44. The ends of the said levers are at their outer sides provided with threaded nuts 19, one for each lever, seated loosely therein, and into these nuts enter the threaded parts of a right and left hand screw, 14, (see Fig. 3,) held against longitudinal motion by bearing 15. The nuts 19 are of square or other irregular shape to prevent them rotating. Turning the said screw in the direction, say, of the arrow 17, by the thumb-nut 18, draws the rear ends of the levers together and separates the jaws; but as the said nuts 19 are seated loosely, as described, it is obvious, should the leather vary in thickness, that the said jaws may yet farther separate, the levers moving along over the screw 14, while the nuts remain stationary, the said levers at their rear ends then acting to compress the spring 20, seated in one of the said levers, and made adjustable as to its force by the screw 21.

The jaws are, by their pivotal connection, adapted to conform to the difference in thickness of the vamp from one to its other end, and the levers, by turning on the pivots 14, enable the jaws to occupy the proper position with relation to the form g as may be necessary, owing to the class of leather being operated upon.

It is essential to the correct operation of the devices that the faces 8 of the jaws and the sides of the form remain substantially parallel, notwithstanding the fact that the levers w are more or less opened at their forward ends. To insure this parallelism of the jaw-faces we provide the leveling devices 22, (herein shown as T-shaped springs,) the horizontal arms of which are parallel each with the other, and which bear against the rear sides of the jaws and keep them normally parallel at their faces. This obviates the possibility of the jaws so turning on the pivots 13 as to fall in the path of movement of and so as to be struck by the form as it descends.

The rubbers 24 are herein shown as corrugated plates carried by arms 25, pivoted at 26 on the levers w, and vibrated rapidly by suitable cranks 27 28 on the shaft 29, provided with a pulley, 30, which may be driven rapidly by a belt thereon in any usual way. The rubbers enter and rest in openings 31 in the jaws, and while in contact with the leather strained over the form and between the jaws are vibrated rapidly, acting to smooth out any wrinkles in the leather, fitting it closely and smoothly to the irregular contour of the form g, after the manner of the usual rub-stick.

It is obvious that the rubbers might be composed of rollers so shaped and held as to come in contact with the leather on the form as the leather is carried downward between the jaws and while the said leather is being stretched and fitted to the form. The rubbers may be made of metal, wood, glass, bone, or other suitable material.

When the rack and form g are elevated, as in Figs. 1 and 2, a vamp to be crimped is laid upon the top of the jaws, when the treadle 32 is depressed. Its link 33 pulls down the lever 34, removing a pin projected from its rear side from contact with the leg-lever 35, pivoted, at 36, on the lever l, permitting the spring m to move the lever b in the direction of the arrow on it, engage the clutch parts, rotate pinion n, and draw down the rack and form. As the form reaches its lowest position a pin, 38, on the rack-bar d strikes the inclined end 59 of the lever 34, and so turns it as to lift the treadle and cause the pin at the rear of the said lever 34 to turn the leg-lever 35 so that its short arm, acting against the upright part b, will move the lever l outward and disengage the clutch parts, stop the rotation of the pinion m, and leave it loose on the shaft k, so that the rack-bar and form g may rise, as before described. As the lever 34 is moved by the pin 38, as described, the link 39 throws down the discharging device or finger 40 from its dotted to its full line position, Fig. 1, causing the said device 40 to strike the vamp at one end, where it folds about the form, and discharge it from the said form.

We claim—

1. In a crimping-machine, the following instrumentalities, viz: a form, a pair of jaws, and one or more independently-movable rubbing devices to act upon the leather on the said form as it is being passed between the jaws by the form, substantially as described.

2. The pivoted levers w and their pivoted jaws, combined with a screw and connections, substantially as described, to open and close the jaws and regulate their distance apart, substantially as set forth.

3. The pivoted jaws p and their carrying-levers w, combined with the leveling-springs 22, to maintain the parallelism of the jaws while the form is elevated, substantially as described.

4. The pivoted jaw-carrying levers w and nuts 19, loosely seated therein, combined with the screw to act upon the nuts and draw the longer ends of the said levers together, and with the spring to permit the longer ends of the said jaws to approach each other independently of the movement of the said screw, substantially as described.

5. In a crimping-machine, the jaw provided with a detachable or changeable face, 8, substantially as and for the purpose set forth.

6. The form and the rubbers and their carrying levers or arms, combined with the rotating cam-shaft to operate the rubbers, substantially as described.

7. The rack and its connected form-carrier and form-plate, combined with the loose pinion $n$, clutch parts 3 4, and means to engage the clutch part 3 with the clutch part 4 of the pinion $n$, to move the rack and form to crimp the upper and to disengage the said clutch parts and free the pinion $n$ and permit the rack and form to be raised, substantially as described.

8. In a crimping-machine, the form, combined with the vamp-discharging device, to discharge the vamp from the form after its passage below the jaws, substantially as described.

9. The rack-bar, combined with the lever 34, the treadle, and its connections, substantially as described, to automatically disengage the clutch and leave the pinion $n$ free on its shaft $k$, substantially as described.

In testimony whereof we have signed our names to this specification in the presence of two subscribing witnesses.

CURTIS STODDARD.
JOHN W. D. FIFIELD.

Witnesses:
JAMES MILLER,
W. H. MONTAGUE.